(12) United States Patent
Florkey et al.

(10) Patent No.: US 7,249,132 B2
(45) Date of Patent: Jul. 24, 2007

(54) TRANSLATION OF INFORMATION BETWEEN DATABASE FORMATS UNDERSTOOD BY DIFFERENT USER EQUIPMENT COMPONENTS FOR DOWNLOAD OF THE INFORMATION FROM NETWORK STORAGE COMPONENT

(75) Inventors: Cynthia Kae Florkey, Chicago, IL (US); Victoria Marie Halsell, Aurora, IL (US); Karla Rae Hunter, Naperville, IL (US); Mrinal Milind Joglekar, Woodridge, IL (US); Randall Joe Wilson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 433 days.

(21) Appl. No.: 10/382,224

(22) Filed: Mar. 5, 2003

(65) Prior Publication Data
US 2004/0177086 A1   Sep. 9, 2004

(51) Int. Cl.
G06F 17/30 (2006.01)
G06F 7/00 (2006.01)
(52) U.S. Cl. .................... 707/10; 707/102; 709/246
(58) Field of Classification Search .................. 707/1, 707/2, 102, 104.1, 201, 204, 10, 101; 705/14; 455/456.1, 566; 709/213, 227, 246, 216, 709/223; 711/103
See application file for complete search history.

(56) References Cited

U.S. PATENT DOCUMENTS 5,608,874 A * 3/1997 Ogawa et al. ............. 709/246

6,405,278 B1   6/2002 Liepe ..................... 711/103
2005/0143136 A1* 6/2005 Lev et al. ................ 455/566

FOREIGN PATENT DOCUMENTS

WO   WO 03/001770 A2 *  1/2003

OTHER PUBLICATIONS

Mark Frauenfelder, The future is at hand, CNN, Jul. 14, 1999, pp. 1-9.*
Handheld Computers, May 20, 2000, pp. 1-6.*
Jeff Covey, Setting Data Free, Nov. 20, 2000, pp. 1-15.*
Marios Dikiakos et al., Intermediaries for the World-Wide Web Overview and Classification, 2002 IEEE, pp. 1-6.*
Database Development on Mobile Devices Improves, May 30, 2002, pp. 1-3.*
Address Book; Corporate Wireless Group—Nextel Online Plus Address Book; customerservice@corporatewireless.com; 800-675-4294; http://www.cwg.net/nextel/nextelonlineplus_ab.htm; 1 pg.; USA; Feb. 4, 2003.
Zak Harin; "Dawn, the Address Converter and Manager"; DAWN; zakharin@seas.upenn.edu.; 3 pgs.; USA; Feb. 18, 2003.

* cited by examiner

Primary Examiner—Jeffrey Gaffin
Assistant Examiner—Jacques Veillard (57) ABSTRACT

Information that is based on a database portion of a first user equipment component is translated from a first database format to a second database format for a download of the information from a network storage component to a second user equipment component. The first database format is understood by the first user equipment component. The second database format is understood by the second user equipment component. The first database format is not understood by the second user equipment component.

23 Claims, 4 Drawing Sheets

TRANSLATION OF INFORMATION BETWEEN DATABASE FORMATS UNDERSTOOD BY DIFFERENT USER EQUIPMENT COMPONENTS FOR DOWNLOAD OF THE INFORMATION FROM NETWORK STORAGE COMPONENT

TECHNICAL FIELD

The invention relates generally to information storage and more particularly to network based data backup.

BACKGROUND

Mobile telephones, personal digital assistants ("PDAs"), and personal computers comprise examples of equipment that users employ to communicate, store, and retrieve information. The user equipment comprises an internal database. The user stores in the internal database personal information, for example, telephone numbers, contact information, and buddy lists. As one shortcoming, if the user equipment breaks or is lost, then the user loses that record of the personal information. As another shortcoming, if the user equipment requires replacement, then to avoid loss of the record of the personal information the user must manually reenter the personal information into an internal database of replacement user equipment.

The user equipment may upload/download information to/from a network based storage device. The network based storage device allows the user equipment to transmit information for storage on a remote network via wireless communication. The network based storage device is able to transfer the information in a single format, between user equipment of a single manufacturer, and within the coverage of a single service provider. However, the network based storage device is unable to transfer the information between different formats, different user equipment manufacturers, and different service providers.

As one shortcoming, the user equipment of a first format, manufacturer, or service provider cannot transfer information through the network based storage device to user equipment of a second format, manufacturer, or service provider that is incompatible with the first format, manufacturer, or service provider.

Thus, a need exists for enhanced database format handling for user equipment information employed with a network based storage device. A further need exists for enhanced storage and retrieval of user equipment information on a network based storage device.

SUMMARY

The invention in one embodiment encompasses a method. Information that is based on a database portion of a first user equipment component is translated from a first database format to a second database format for a download of the information from a network storage component to a second user equipment component. The first database format is understood by the first user equipment component. The second database format is understood by the second user equipment component. The first database format is not understood by the second user equipment component.

Another embodiment of the invention encompasses an apparatus. The apparatus comprises a network storage component and a translation component. The network storage component stores information that is based on one or more database portions of one or more user equipment components. The one or more user equipment components comprise a first user equipment component and a second user equipment component. The translation component communicatively couples the network storage component with one or more of the one or more database portions of the one or more user equipment components. The one or more database portions of the one or more user equipment components comprise a database portion of the first user equipment component. The information that is based on the one or more database portions of the one or more user equipment components comprises first information that is based on the database portion of the first user equipment component. The translation component converts the first information from a first database format to a second database format for a download of the first information from the network storage component to the second user equipment component. The first database format is understood by the first user equipment component. The second database format is understood by the second user equipment component. The first database format is not understood by the second user equipment component.

Yet another embodiment of the invention encompasses an article. The article comprises one or more computer-readable signal-bearing media. The article includes means in the one or more media for translating information that is based on a database portion of a first user equipment component from a first database format to a second database format for a download of the information from a network storage component to a second user equipment component. The first database format is understood by the first user equipment component. The second database format is understood by the second user equipment component. The first database format is not understood by the second user equipment component.

DESCRIPTION OF THE DRAWINGS

Features of exemplary implementations of the invention will become apparent from the description, the claims, and the accompanying drawings in which:

DETAILED DESCRIPTION

Figure 1:
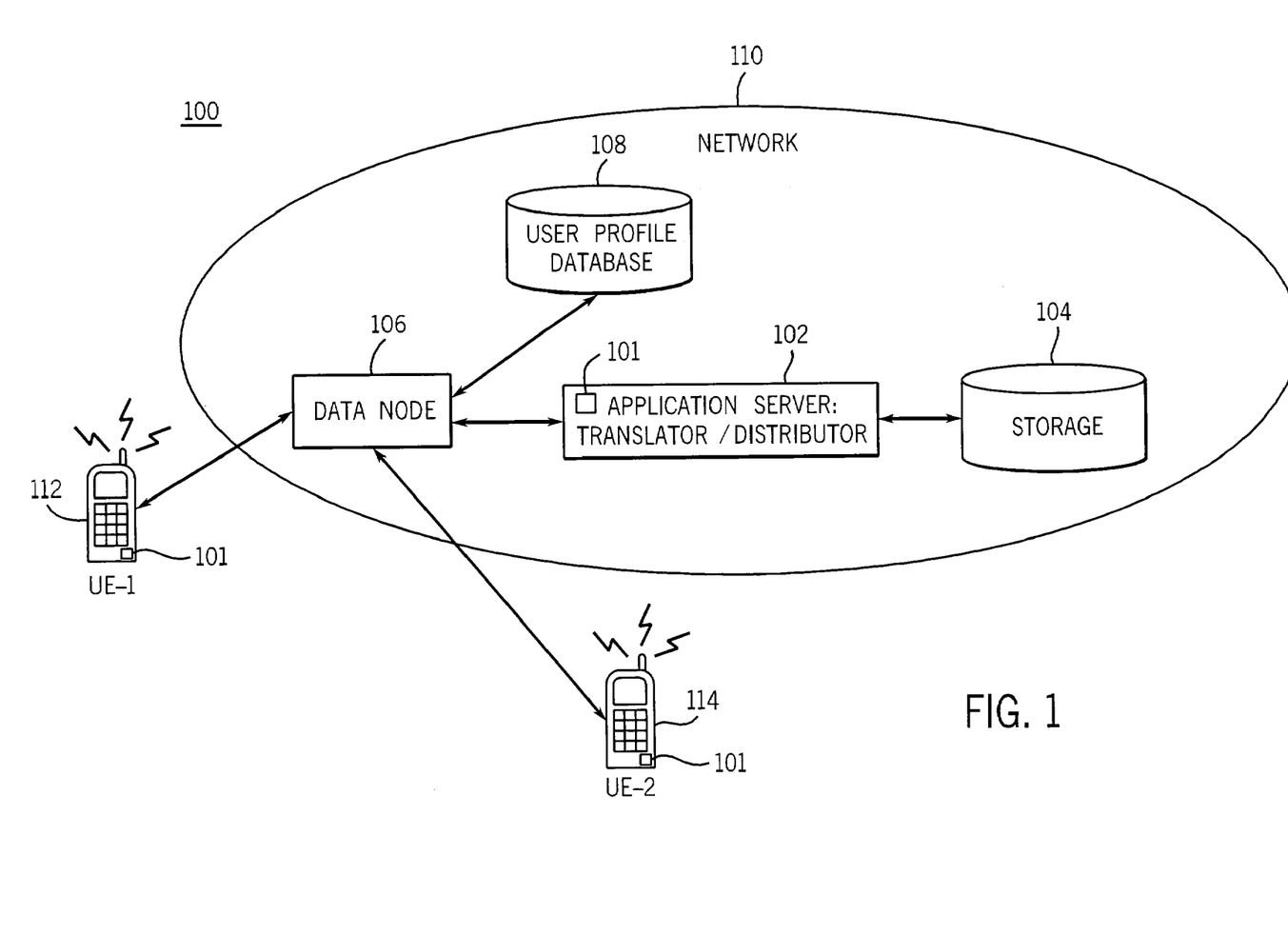
FIG. 1 is a representation of an exemplary implementation of an apparatus that comprises one or more application servers, one or more network storage components, one or more data nodes, one or more user profile databases, one or more networks, and one or more user equipment components.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more networks 110 and one or more user equipment components 112 and/or 114. The user equipment components 112 and 114 in one example are operable by one or more users. The users of the user equipment components 112 and 114 in one example comprise human operators.

The network 110 in one example provides a database backup service for one or more of the user equipment components 112 and 114. The user equipment components 112 and 114 comprise respective internal databases stored in respective instances of a recordable data storage medium 101, as described herein. The database backup service of the network 110 in one example allows the user equipment component 112 to upload a portion of the internal database of the user equipment component 112 to a network storage component 104. The portion of the internal database comprises all or one or more subportions of the internal database of the user equipment component 112. The internal database of the user equipment component 112 stores personal information (e.g., phone books, address books, buddy lists, presence lists, birthday lists, and internet bookmarks) of a user of the user equipment component 112.

In another example, the database backup service of the network 110 allows a user to employ the user equipment component 114 to download the portion of the internal database from the network storage component 104. The user equipment component 114 may populate a portion of the internal database of the user equipment component 114 with the portion of the internal database downloaded from the network storage component 104. The user equipment component 114 populates the portion of the internal database of the user equipment component 114 by storing the portion of the internal database downloaded from the network storage component 104 in the portion of the internal database of the user equipment component 114.

The network 110 in one example comprises one or more application servers 102, one or more network storage components 104, one or more data nodes 106, and one or more user profile databases 108. In one example, the application server 102, the network storage component 104, the data node 106, and the user profile database 108 comprise one or more of computer software, computer hardware, and/or telecommunications network components. The network 110 in one example serves to provide a medium to transmit messages between the application server 102, the network storage component 104, the data node 106, the user profile database 108, and the user equipment components 112 and 114.

The application server 102 in one example communicatively couples the network storage component 104 with the user equipment components 112 and 114. For example, the application server 102 processes and forwards messages between the network storage component 104 and the user equipment components 112 and 114 to communicatively couple the network storage component 104 with the user equipment components 112 and 114. The application server 102 comprises a distributor component and/or a translator component, for example, located in an instance of the recordable data storage medium 101.

In one example, the application server 102 comprises a distributor component that controls storage and retrieval of information with respect to the network storage component 104. For example, the application server 102 may communicate information from the user equipment component 112 to the network storage component 104. The application server 102 may also communicate the information from the network storage component 104 to the user equipment component 114.

In a further example, the application server 102 comprises a translator component that converts information from a database format (e.g., a first database language) of the user equipment component 112 to a database format (e.g., a second database language) of the user equipment component 114. Exemplary situations exist where the application server 102 may make a conversion between the database format of the user equipment component 112 and the database format of the user equipment component 114. For example, the user equipment components 112 and 114 may be made by different manufacturers that employ different database formats. In another example, the user equipment components 112 and 114 may be made by a same manufacturer but employ different database formats. In yet another example, the user equipment components 112 and 114 may be supported by different service providers. In still yet another example, the user equipment components 112 and 114 may employ different air interface technologies.

In one example, the network storage component 104 serves to store information forwarded from the application server 102 that is based on one or more portions of the internal database of one or more user equipment components (e.g., the user equipment components 112 and 114). The information that is based on the one or more portions of the internal database in one example comprises a copy of the portion of the internal database of the user equipment component 112. The information that is based on the one or more portions of the internal database in another example comprises a translation of the portion of the internal database of the user equipment component 112.

The network storage component 104 comprises a database with one or more entries. The entries in one example correspond to personal information of the internal databases of the user equipment components 112 and 114. The entries store information that is representative of the phone books, the address books, the buddy lists, the presence lists, the birthday lists, and the internet bookmarks of the internal databases of the user equipment components 112 and 114.

In one example, the network storage component 104 stores the one or more entries in one or more database formats. In one example, the network storage component 104 may store entries in one or more native database formats for one of the user equipment components 112 and 114. In another example, the network storage component 104 may store entries in a universal database format common to the user equipment components 112 and 114. In one example, the network storage component 104 is integrated into the application server 102. In another example, the network storage component 104 is integrated into the user profile database 108. In yet another example, the network storage component 104 comprises a standalone database operating within the network 110.

In one example, the data node 106 serves to receive, process, and/or forward messages between the application server component 102 and the user equipment components 112 and 114. In a further example, the data node 106 checks the user profile from the user profile database 108 of the user equipment components 112 and 114 for an indication of a subscription to the database backup service. The data node 106 comprises one or more of a Serving General Packet Radio Service ("GPRS") Support Node ("SGSN"), a Gateway GPRS Support Node ("GGSN"), a Packet Data Serving Node ("PDSN"), a short message service center ("SMSC"), and a call state control function ("CSCF") component.

The data node 106 queries the user profile database 108 to retrieve stored user profiles of the user equipment components 112 and 114. The user profile database 108 comprises a home location register ("HLR"). The user profile database 108 processes one or more user profile query messages from the data node 106. Upon receipt of one of the user profile query messages from the data node 106, the user profile database 108 returns the user profile which corresponds to the user equipment components 112 and 114 requested by the data node 106. For example, the user profile database 108 sends the user profile of the user equipment component 112 to the data node 106. The user profile indicates to the data node 106 whether the user equipment component 112 subscribes to the database backup service and therefore whether the user equipment component 112 may employ the database backup service. The user profile comprises information regarding services available to the user, for example, database backup service subscription information, permissions, conference call services, voice mail, and/or data and voice communications.

The user equipment components 112 and 114 in one example serve to initiate an upload or a download of information with the network storage component 104. The user equipment components 112 and 114 communicate via the network 110. For example, the user equipment components 112 and 114 engage in mobile telephone communication, for example, calls, voice mail, and short messaging services ("SMS"), via the network 110. The user equipment components 112 and 114 in one example comprise one or more of handheld devices, mobile telephones, cellular phones, mobile computers, personal digital assistants ("PDAs"), and personal computers.

In one example, the user equipment components 112 and 114 comprise respective translator components stored in respective instances of the recordable data storage medium 101. The translator component of the user equipment component 112 and/or 114 translates information from a native database format for that user equipment component 112 and/or 114 to the universal database format for storage in the network storage component 104.

The user of the user equipment component 112 in one example employs a user interface of the user equipment component 112 to initiate a call to the user equipment component 114. In another example, the user of the user equipment component 112 employs the user interface to initiate an upload of the information stored in the internal database of the user equipment component 112 to the network storage component 104. To initiate the upload, the user of the user equipment component 112 in one example activates a backup database function of the user interface. In yet another example, the user of the user equipment component 112 employs the user interface to initiate a download of the information from the network storage component 104. To initiate the download, the user of the user equipment component 112 in one example activates a retrieve database function of the user interface.

An illustrative description of exemplary operation of the apparatus 100 is presented, for explanatory purposes. The user equipment component 112 uploads information that is based on a portion of the internal database of the user equipment component 112 to the application server 102 for storage in the network storage component 104. For example, the portion of the internal database comprises a representation of the phone book and the address book of the internal database of the user equipment component 112. The application server 102 may serve as an information translator and/or an information distributor. In one example, the application server 102 translates the information from a first database format to a second database format before storage in the network storage component 104. In another example, the application server 102 distributes the information without change to the network storage component 104. The network storage component 104 stores the information and awaits a request for retrieval of the information.

Either of the user equipment components 112 and 114 may download the information that is based on the portion of the internal database from the network storage component 104. For example, the user equipment component 114 sends the request for retrieval to the network 110 to download the information from the network storage component 104. The application server 102 accesses the information from the network storage component 104. The application server 102 determines from the user profile of the user equipment component 114 a database format that is understood by the user equipment component 114. For example, the database format that is understood by the user equipment component 114 is a database format that the user equipment component 114 employs or is a database format that the user equipment component 114 can translate to the database format that the user equipment component 114 employs.

If a translation is necessary before the download, then the application server 102 translates the information to the database format that is understood by the user equipment component 114. The application server 102 sends the information in the database format that is understood by the user equipment component 114 to the data node 106. The data node 106 forwards the information to the user equipment component 114. The user equipment component 114 populates a portion of the internal database of the user equipment component 114 with the information. For example, after the population of the internal database of the user equipment component 114, the phone book and the address book of the internal database of the user equipment component 114 comprise a representation of the phone book and the address book of the internal database of the user equipment component 112.

Exemplary situations exist that may motivate the user equipment component 114 to populate the portion of the internal database of the user equipment component 114 with the information of the internal database of the user equipment component 112. In one example, a user of the user equipment component 112 wishes to employ a different user equipment component (e.g., the user equipment component 114). For example, the user wants to upgrade to a new user equipment component, the user equipment component 112 is lost, stolen, or broken, or the user changes to a service provider that is not compatible with the user equipment component 112.

The user at one time programmed the internal database of the user equipment component 112 to store the phone book and the address book. Therefore, when the user begins employment of the user equipment component 114, the user wants the internal database of the user equipment component 114 to store the phone book and the address book previously stored in the user equipment component 112.

However, the user does not want to program the internal database of the user equipment component 114 to store the phone book and the address book. Therefore, the user employs the database backup service to populate the internal database of the user equipment component 114 to store the phone book and the address book of the user equipment component 112 in the user equipment component 114.

Figure 2:
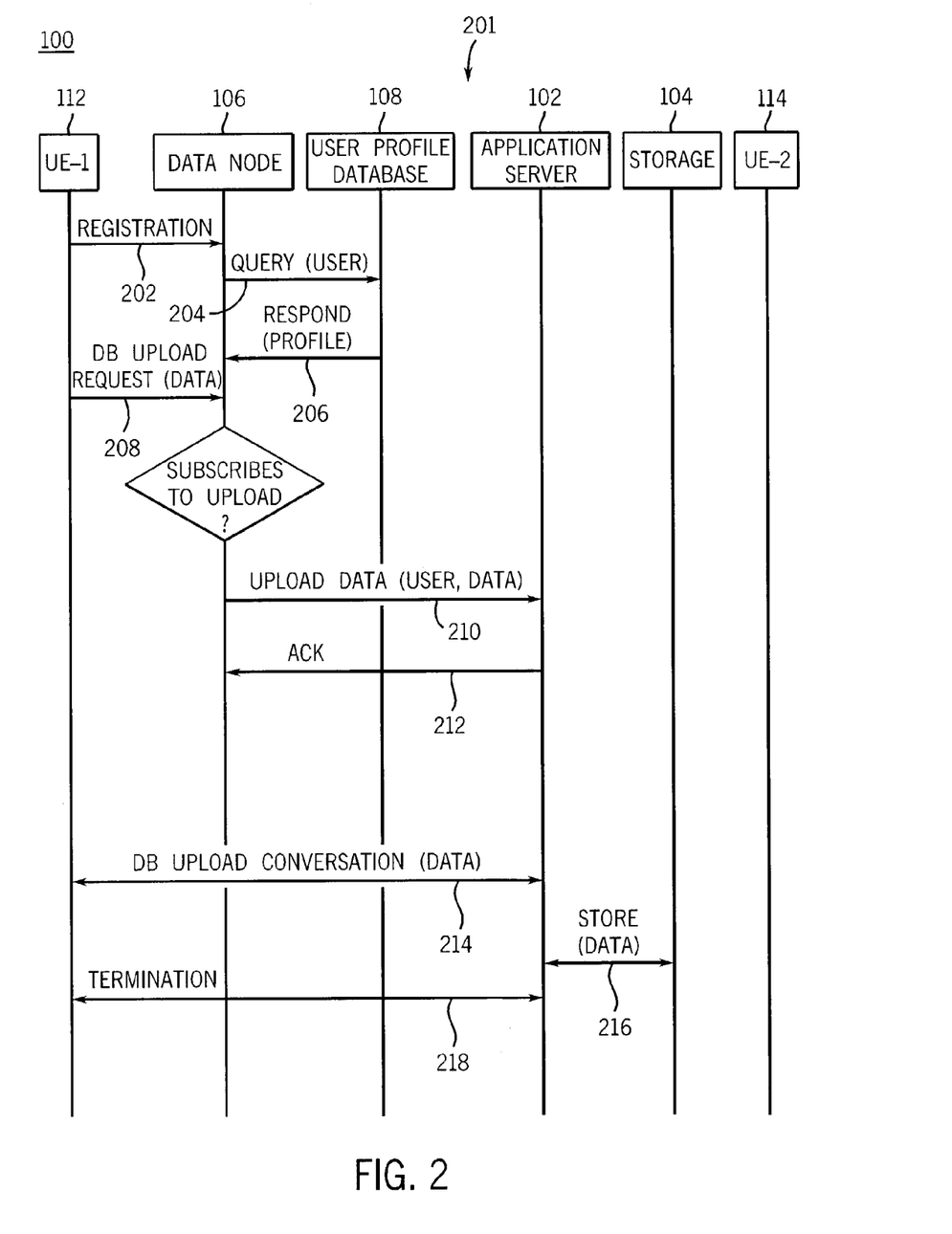
FIG. 2 is a representation of one exemplary message flow between one of the application servers and one of the user equipment components of the apparatus of FIG. 1, illustrating a manually initiated upload of information based on a database portion of the user equipment component to one of the network storage components.

Turning to FIG. 2, a message flow 201 represents an exemplary registration of the user equipment component 112 and an exemplary upload of information that is based on a portion of the internal database of the user equipment component 112 from the user equipment component 112 to the network storage component 104. The message flow 201 illustrates one example of the user of the user equipment component 112 manually initiating the upload of the information.

To register the user equipment component 112 with the network 110 (FIG. 1), the user equipment component 112 sends a registration message 202 to the data node 106. "REGISTRATION" in one example serves to represent the registration message 202. Upon receipt of the registration message 202, the data node 106 sends a query message 204 to the user profile database 108. "QUERY (USER)" in one example serves to represent the query message 206. "USER" in one example serves to represent an indication of the user equipment component 112. The query message 206 initiates a download of the user profile of the user equipment component 112 from the user profile database 108.

Upon receipt of the query message 206, the user profile database 108 in one example sends a response message 206 to the data node 106. "RESPOND (PROFILE)" in one example serves to represent the response message 206. "PROFILE" in one example serves to represent an indication of the user profile of the user equipment component 112. The user profile of the user equipment component 112 in one example comprises database backup service information of the user equipment component 112, for example, whether the user equipment component 112 subscribes to the database backup service.

To begin the upload of the information to the network storage component 104, the user equipment component 112 sends an upload initiation message 208 to the data node 106. "DB UPLOAD REQUEST (DATA)" in one example serves to represent the upload initiation message 208. "DATA" in one example serves to represent the information for upload to the network storage component 104. The "DATA" of the upload initiation message 208 in one example comprises the entire contents of the information that is based on the portion of the internal database. The "DATA" of the upload initiation message 208 in another example comprises a portion of the entire contents of the information that is based on the portion of the internal database (e.g., a first block of data). The "DATA" of the upload initiation message 208 in yet another example comprises a header that comprises an indication of the size of the information that is based on the portion of the internal database. The "DATA" of the upload initiation message 208 in still yet another example is empty.

Upon receipt of the upload initiation message 208, the data node 106 checks the user profile of the user equipment component 112 for an indication of a subscription to the database backup service. If the user equipment component 112 subscribes to the database backup service, then the data node 106 sends an upload data message 210 to the application server 102. "UPLOAD DATA (USER, DATA)" in one example serves to represent the upload data message 210. "USER" the in one example serves to represent an indication of the user equipment component 112. "DATA" in one example serves to represent the information that corresponds to the "DATA" of the upload initiation message 208. Upon receipt of the upload data message 210, the application server 102 sends an acknowledgement message 212 to the data node 106. The acknowledgement message 212 indicates to the data node 106 that the application server 102 is ready for any additional data in connection with the "DATA" of the upload data message 210.

Upon receipt of the acknowledgement message 212, the data node 106 initiates an upload conversation 214 between the user equipment component 112 and the application server 102. "DB UPLOAD CONVERSATION (DATA)" in one example serves to represent the upload conversation 214. "DATA" in one example serves to represent the additional data in connection with the "DATA" of the upload data message 210. The upload conversation 214 between the user equipment component 112 and the application server 102 physically passes through the data node 106. For example, the upload conversation 214 comprises one or more individual messages sent from the user equipment component 112 to the data node 106 and then forwarded to the application server 102. The one or more individual messages comprise one or more blocks of the entire contents of the information for upload to the network storage component 104.

In one example, the application server 102 sends the information to the network storage component 104 for storage in the network storage component 104 in the database format (e.g., database language) of the user equipment component 112. In another example, the application server 102 translates the information to a database format common to the user equipment components 112 and 114 for storage in the network storage component 104. In a further example, the application server 102 translates the information to the universal database format common to the user equipment components 112 and 114 (e.g., all user equipment components) for storage in the network storage component 104.

The application server 102 sends the information to the network storage component 104 during storage conversation 216. "STORE (DATA)" in one example serves to represent the storage conversation 216. Upon completion of the upload conversation 214 and the storage conversation 216, the upload is ended with termination message 218.

Figure 3:
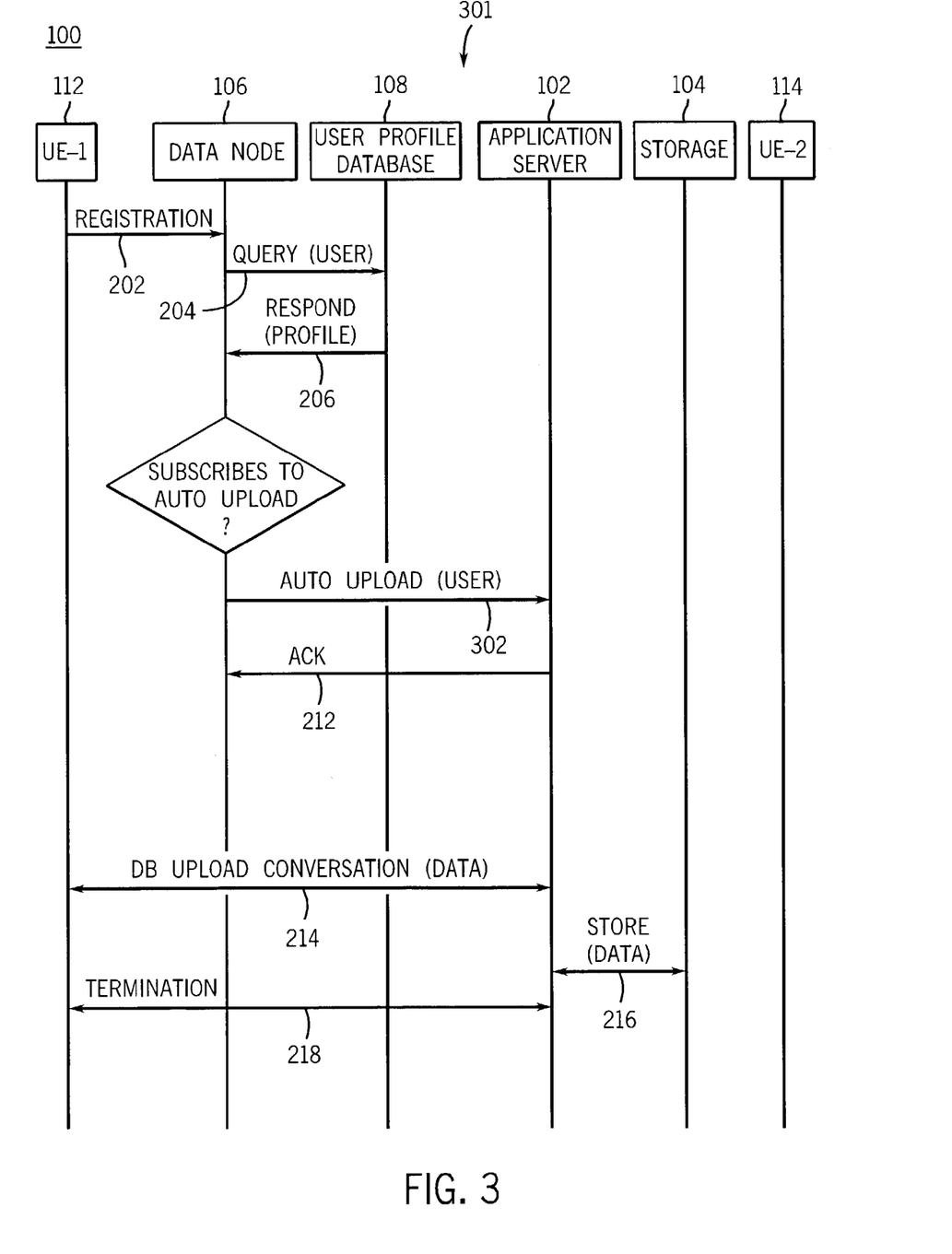
FIG. 3 is a representation of another exemplary message flow between one of the application servers and one of the user equipment components of the apparatus of FIG. 1, illustrating an automatically initiated upload of information based on a database portion of the user equipment component to one of the network storage components.

Turning to FIG. 3, a message flow 301 represents an exemplary registration of the user equipment component 112 and an exemplary upload of information that is based on a portion of the internal database of the user equipment component 112 from the user equipment component 112 to the network storage component 104. The message flow 301 illustrates one example of the upload of the information automatically initiated at some predefined time or upon expiration of a predefined time interval. A provider of the database backup service may set the time and/or time interval (e.g., automatically initiated on a weekly basis).

The registration of the user equipment component 112 with the network 110 (FIG. 1), the retrieval of the user profile from the user profile database 108, and checking the user profile for the indication of the subscription to the database backup service are accomplished in the message flow 301 as described in the message flow 201. The user profile of the user equipment component 112 in one example comprises automatic database backup service information of the user equipment component 112 (e.g., whether the user equipment component 112 subscribes to the automatic database backup service). In the message flow 301, during the step of checking the user profile for the indication of the subscription to the database backup service, the data node 106 additionally checks for an indication whether the user equipment component 112 subscribes to the automatic upload feature of the database backup service.

In one example, at the predefined time or upon the expiration of the predefined time interval, the data node 106 initiates the automatic upload of the information to the network storage component 104. The data node 106 sends an upload initiation message 302 to the application server 102. "AUTO UPLOAD (USER)" in one example serves to represent the upload initiation message 302. "USER" in one example serves to represent an indication of the user equipment component 112.

In another example, the data node 106 sends an automatic upload message to the application server 102 (e.g., upon registration of the user equipment component 112). Upon receipt of the automatic upload message, the application server 102 determines if the predefined time or upon the expiration of the predefined time interval has occurred. If the predefined time has been reached or if the time interval has expiration, then the data node 106 initiates upload conversation 214 between the user equipment component 112 and the application server 102 as described in the message flow 201. The remainder of the upload is accomplished in the message flow 301 as described in the message flow 201.

Figure 4:
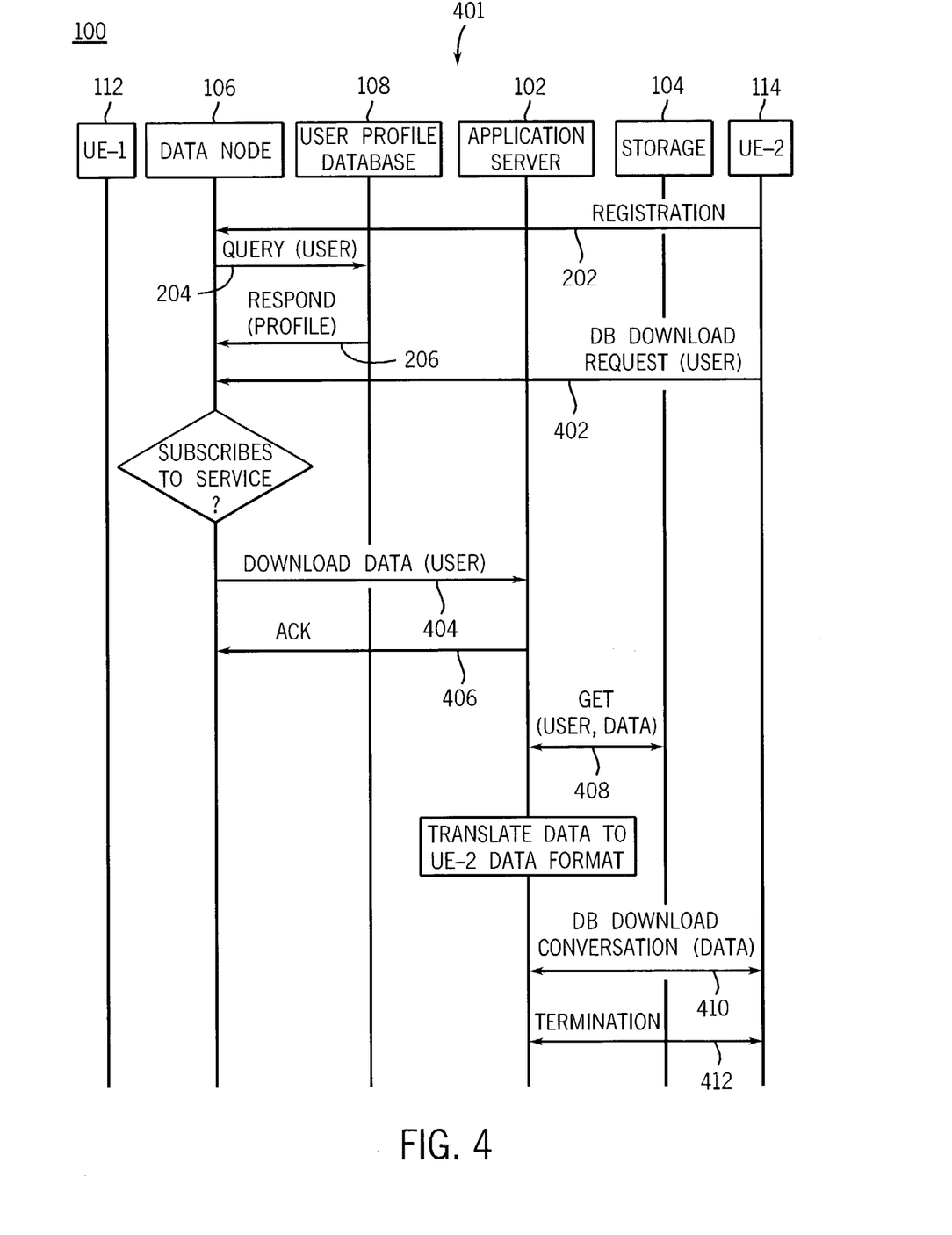
FIG. 4 is a representation of yet another exemplary message flow between one of the application servers and one of the user equipment components of the apparatus of FIG. 1, illustrating a download of information based on a database portion of one of the user equipment components from one of the network storage components.

Turning to FIG. 4, a message flow 401 represents an exemplary registration of the user equipment component 114 and an exemplary download of the information that is based on the portion of the internal database of the user equipment component 112 from the network storage component 104 to the user equipment component 114. The registration of the user equipment component 114 with the network 110 (FIG. 1), the retrieval of the user profile from the user profile database 108, and checking the user profile for the indication of the subscription to the database backup service are accomplished in the message flow 401 as described in the message flow 201.

To begin the download of the information from the network storage component 104, the user equipment component 114 sends a download initiation message 402 to the data node 106. "DB DOWNLOAD REQUEST (USER)" in one example serves to represent the download initiation message 402. In one example, "USER" serves to represent an indication of the user equipment component 114. In another example, "USER" serves to represent an indication of any other user equipment component (e.g., the user equipment component 112) that has a portion of the internal database stored in the network storage component 104. The download initiation message 402 requests the portion of the internal database that corresponds to the user equipment component indicated by "USER."

Upon receipt of the download initiation message 402, the data node 106 sends an download data message 404 to the application server 102. "DOWNLOAD DATA (USER)" in one example serves to represent the download data message 404. Upon receipt of the download data message 404, the application server 102 sends an acknowledgement message 406 to the data node 106. The application server 102 then begins a database retrieval conversation 408 with the network storage component 104 to retrieve the information that is based on the portion of the internal database of the user equipment component indicated by "USER." "GET (USER, DATA)" in one example serves to represent the database retrieval conversation 408. "DATA" in one example serves to represent the information that is based on the portion of the internal database of the user equipment component indicated by "USER."

The application server 102 employs the user profile of the user equipment component 114 to determine which database format is understood by the user equipment component 114, for example, a native database format for the user equipment component 114. The application server 102 translates the information that is based on the portion of the internal database of the user equipment component indicated by "USER" to the database format that is understood by the user equipment component 114. For example, the application server 102 generates a database in the database format that is understood by the user equipment component 114 based on the information of the portion of the internal database of the user equipment component indicated by "USER." In another example, the user equipment component 114 translates the information based on the portion of the internal database of the user equipment component indicated by "USER" to the database format that is understood by the user equipment component 114.

Once the application server 102 translates the information, then the application server 102 begins a download conversation 410 with the user equipment component 114. "DB DOWNLOAD CONVERSATION (DATA)" in one example serves to represent the download conversation 410. "DATA" in one example serves to represent the information in the database format that is understood by the user equipment component 114. The download conversation 410 between the user equipment component 114 and the application server 102 physically passes through the data node 106. For example, the download conversation 410 comprises one or more individual messages sent from the application server 102 to the data node 106 and then forwarded to the user equipment component 114. The one or more individual messages comprise one or more blocks of the entire contents of the information in the database format that is understood by the user equipment component 114 for download to the user equipment component 114. Upon completion of the download conversation 410, the download is ended with termination message 412.

The apparatus 100 in one example employs one or more computer-readable signal-bearing media. Examples of a computer-readable signal-bearing medium for the apparatus 100 comprise the recordable data storage medium 101 of the application server 102, the recordable data storage medium 101 of the user equipment component 112, and the recordable data storage medium 101 of the user equipment component 114. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising: the steps of:
   formulating a first database having a first database format;
   formulating a second database having a second database format;
   translating information that is based on a database portion of a first mobile telephone from the first database format to the second database format for a download of the information from a network storage component to a second mobile terminal;
   wherein the first database format is understood by the first mobile telephone, wherein the second database format is understood by the second mobile terminal, wherein the first database format is not understood by the second mobile terminal;
   wherein the first database format comprises a first database language that is not supported by the second mobile terminal, wherein the information is stored in the first mobile telephone in the first database language;
   wherein the second database format comprises a second database language that is supported by the second mobile terminal; and
   downloading information either of the first mobile telephone and the second mobile terminal from the network element;
   the first mobile telephone being supported by a first service provider, and the second mobile terminal being supported by a second service provider, the first mobile telephone and the second mobile terminal using different air interface technologies for communicating with the respective first and second providers.

2. The method of claim 1, wherein the step of translating the information that is based on the database portion of the first user equipment component from the first database format to the second database format for the download of the information from the network storage component to the second user equipment component comprises the steps of:
   obtaining by an application server component the information in the first database format from the network storage component, wherein the first database format comprises a native format for the first user equipment component;
   determining by the application server component that the second database format comprises a native format for the second user equipment component; and
   translating by the application server component the information from the native format for the first user equipment component to the native format for the second user equipment component.

3. The method of claim 2, wherein the step of translating by the application server component the information from the native format for the first user equipment component to the native format for the second user equipment component comprises the steps of:
   populating a database portion of the second user equipment component with the information in the native format for the second user equipment component.

4. The method of claim 1, wherein the step of translating the information that is based on the database portion of the first user equipment component from the first database format to the second database format for the download of the information from the network storage component to the second user equipment component comprises the steps of:
   obtaining from the database portion the information in the first database format, wherein the first database format comprises a native format for the first user equipment component; and
   translating the information from the native format for the first user equipment component to the second database format, wherein the second database format comprises a common format that is common to both the first user equipment component and the second user equipment component.

5. The method of claim 4, further comprising the step of:
   storing by the network storage component the information in the common format.

6. The method of claim 5, further comprising the steps of:
   obtaining from the network storage component the information in the common format;
   translating the information from the common format to a native format for the second user equipment component; and
   populating a database portion of the second user equipment component with the information in the native format for the second user equipment component.

7. The method of claim 1, further comprising the step of:
   transmitting over a telecommunications air interface the information from the first user equipment component to an application server component for an upload of the information to the network storage component.

8. The method of claim 7, wherein the first user equipment component comprises a mobile telephone, wherein the database portion is internal to the mobile telephone, wherein the step of transmitting the information from the first user equipment component to the application server component for the upload of the information to the network storage component comprises the steps of:
   initiating by the mobile telephone a transfer of the information from the mobile telephone to the network storage component.

9. The method of claim 1, wherein the first user equipment component comprises a mobile telephone, wherein the database portion is internal to the mobile telephone, wherein the step of transmitting the information from the first user equipment component to the application server component for the upload of the information to the network storage component comprises the steps of:
   initiating by the application server component a transfer of the information from the mobile telephone to the network storage component.

10. The method of claim 1, wherein the information that is based on the database portion of the first user equipment component comprises first information that is based on the database portion of the first user equipment component, the method further comprising the step of:
    storing by the network storage component second information of a third database format that is based on a database portion of a third user equipment component, wherein the third database format and the first database format comprise different formats.

11. The method of claim 1, wherein the information comprises phone book information of the first mobile telephone, the step of translating the information from the first database language to the second database language to allow the information from the first mobile telephone to be stored in second mobile telephone comprise the steps of:
    transferring the phone book information in the first database language from the first mobile phone over a telecommunications air interface;
    translating the phone book information from the first database language to the second database language; and
    transferring the phone book information in the second database language to the second mobile telephone over a telecommunications air interface.

12. The method of claim 11, wherein the first mobile telephone is supported by a different service provider than the second mobile telephone.

13. The method of claim 11, wherein the first mobile telephone is produced by a different equipment manufacturer than the second mobile telephone.

14. The method of claim 11, wherein the first mobile telephone is supported by a different telecommunications air interface technology than the second mobile telephone.

15. An apparatus, comprising:
a network storage component that stores information that is based on one or more database portions of one or more user equipment components, wherein the one or more user equipment components comprise a first user equipment component and a second user equipment component; and
a translation component that communicatively couples the network storage component with one or more of the one or more database portions of the one or more user equipment components;
wherein the one or more database portions of the one or more user equipment components comprise a database portion of the first user equipment component, wherein the information that is based on the one or more database portion of the one or more user equipment components comprises first information that is based on the database portion of the first user equipment component;
wherein the translation component converts the first information from a first database format to a second database format for a download of the first information from the network storage component to the second user equipment component;
wherein the first database format is understood by the first user equipment component, wherein the second database format is understood by the second user equipment component, wherein the first database format is not understood by the second user equipment component;
the first user equipment component being supported by a first service provider, and the second user equipment component being supported by a second service provider, the first and second user equipment components using different air interface technologies for communicating with the respective first and second service providers.

16. The apparatus of claim 15, wherein the translation component comprises an application server component that resides within a telecommunications network that supports the first user equipment component;
wherein the first database format comprises a native format for the first user equipment component, wherein the second database format comprises a native format for the second user equipment component;
wherein the application server component obtains the first information in the native format for the first user equipment component from the network storage component;
wherein the application server component translates the first information from the native format for the first user equipment component to the native format for the second user equipment component.

17. The apparatus of claim 15, wherein the translation component comprises an application server component that resides within a telecommunications network that supports the first user equipment component;
wherein the first database format comprises a common format to the first user equipment component and the second user equipment component, wherein the second database format comprises a native format for the second user equipment component;
wherein the application server component translates the first information from the native format for the first user equipment component to the common format.

18. The apparatus of claim 15, wherein the translation component resides within the first user equipment component, wherein the first database format comprises a native format for the first user equipment component, wherein the second database format comprises a common format to the first user equipment component and the second user equipment component;
wherein the translation component within the first user equipment component translates the first information from the native format for the first user equipment component to the common format.

19. The apparatus of claim 15, wherein the first user equipment component initiates a transfer of the first information from the first user equipment component to the network storage component.

20. The apparatus of claim 15, wherein an application server component that resides within a telecommunications network that supports the first user equipment component initiates a transfer of the first information from the first user equipment component to the network storage component;
wherein the application server component initiates the transfer at a user defined time or an expiration of a user defined time interval.

21. The apparatus of claim 15, wherein the second user equipment component downloads the first information from the network storage component to populate a database portion of the second user equipment component.

22. The apparatus of claim 15, wherein the first user equipment component and the second user equipment component comprise respective first and second mobile telephones.

23. The apparatus of claim 22, wherein the first information comprises a phone book of the first mobile telephone, wherein the second mobile telephone downloads the phone book of the first mobile telephone from the network storage component to reproduce the phone book of the first mobile telephone in a database potion of the second mobile telephone.

* * * * *